United States Patent
Howard et al.

(10) Patent No.: US 8,694,406 B2
(45) Date of Patent: Apr. 8, 2014

(54) STRATEGY MARKET BAROMETER

(75) Inventors: C. Thomas Howard, Littleton, CO (US); Andrew Howard, Castle Rock, CO (US)

(73) Assignee: AthenaInvest, Inc., Englewood, CO (US)

( * ) Notice: Subject to any disclaimer, the term of this patent is extended or adjusted under 35 U.S.C. 154(b) by 5 days.

(21) Appl. No.: 13/428,881

(22) Filed: Mar. 23, 2012

(65) Prior Publication Data

US 2012/0254064 A1 Oct. 4, 2012

Related U.S. Application Data

(60) Provisional application No. 61/468,930, filed on Mar. 29, 2011.

(51) Int. Cl.
*G06Q 40/00* (2012.01)

(52) U.S. Cl.
USPC .............................. 705/36 R; 705/35; 705/37

(58) Field of Classification Search
USPC ........................................... 705/36 R, 35–37
See application file for complete search history.

(56) References Cited

U.S. PATENT DOCUMENTS

| | | | |
|---|---|---|---|
| 5,371,807 A | 12/1994 | Register et al. | |
| 5,806,048 A | 9/1998 | Kiron et al. | |
| 5,812,987 A | 9/1998 | Luskin et al. | |
| 5,941,945 A | 8/1999 | Aditham et al. | |
| 6,055,517 A | 4/2000 | Friend et al. | |
| 6,282,520 B1 | 8/2001 | Schirripa | |
| 6,370,516 B1 | 4/2002 | Reese | |
| 6,484,151 B1 | 11/2002 | O'Shaughnessy | |
| 6,968,317 B1 | 11/2005 | Wallace et al. | |
| 6,983,257 B2 | 1/2006 | Gatto | |
| 7,590,582 B2 | 9/2009 | Dunne | |
| 7,610,230 B2 | 10/2009 | Festog et al. | |
| 7,644,011 B2 | 1/2010 | Shkedy | |
| 7,668,773 B1 | 2/2010 | Pruitt | |
| 7,734,526 B2 | 6/2010 | Howard et al. | |
| 7,783,547 B1 | 8/2010 | Gorer | |
| 7,877,309 B2 | 1/2011 | Gatto et al. | |
| 7,941,359 B2 | 5/2011 | Tanner | |
| 2003/0046209 A1 | 3/2003 | Brandenberger et al. | |
| 2005/0021465 A1 | 1/2005 | Segerstrom | |
| 2006/0080227 A1 | 4/2006 | Boglaev | |
| 2007/0112662 A1 | 5/2007 | Kumar | |
| 2008/0071702 A1* | 3/2008 | Howard et al. ............. | 705/36 R |
| 2008/0082460 A1 | 4/2008 | Hutcheson et al. | |

(Continued)

OTHER PUBLICATIONS

Melvyn Teo and Sung-Jun Woo, Style effects in the cross-section of stock returns, Jun. 2004.*

(Continued)

*Primary Examiner* — Lindsay M Maguire
*Assistant Examiner* — Hao Fu
(74) *Attorney, Agent, or Firm* — Sheridan Ross P.C.

(57) ABSTRACT

The present invention is directed to an alternative method for gauging market participant behavior, which is identified herein as "Market Barometer." In one embodiment, Market Barometer is based on the recent performance ranks of particular equity strategy indices as compared to their historical ranks. Significant deviations from historical ranks is a predictor of market performance over subsequent near term time periods, for example, a subsequent month and, in turn, these deviations can be used to estimate the current market expected return. Empirical tests reveal that expected market returns vary over time in line with Market Barometer readings.

22 Claims, 3 Drawing Sheets

| US and International Equity Strategy Ranks: 1988-2007 | | |
|---|---|---|
| Strategy | US Strategy Rank | International Strategy Rank |
| Competitive Position | 2 | 4 |
| Economic Conditions | 8 | 3 |
| Future Growth | 1 | 2 |
| Market Conditions | 7 | 7 |
| Opportunity | 3 | 5 |
| Profitability | 4 | 10 |
| Quantitative | 5 | 8 |
| Risk | 10 | 1 |
| Social Considerations | 9 | 9 |
| Valuation | 6 | 6 |

(56) References Cited

U.S. PATENT DOCUMENTS

| | | |
|---|---|---|
| 2008/0288386 A1 | 11/2008 | Ferris |
| 2009/0186689 A1 | 7/2009 | Hughes et al. |
| 2009/0198633 A1 | 8/2009 | Howard et al. |
| 2009/0271332 A1 | 10/2009 | Lo et al. |
| 2010/0169237 A1 | 7/2010 | Howard et al. |

OTHER PUBLICATIONS

Agarwal et al., "Generalised Style Analysis of Hedge Funds," J. Asset Management, 2000, vol. 1(1), pp. 93-109.
Albertson, Joshua "Large-Cap Growth is Back", Nov. 18, 2005. SmartMoney.com.
Brown, Stephen J. and Goetzmann, William N., "Mutual fund styles", Journal of Financial Economics 43 (1997) 373-399.
Callahan et al., "Boxes are not Classes," Investment Advisor Magazine, Jan. 2006, pp. 1-5.
Callahan et al., "Outside the Box", Investment Advisor, Sep. 2005, pp. 84-88.
Callahan et al., "Risky Business," Investment Advisor Magazine, Feb. 2006, pp. 1-8.
Cremers et al., "How Active Is Your Fund Manager? A New Measure That Predicts Performance", available at www.ssrn.com.abstract=891719. Jan. 15, 2007, 57 pages.
"Fact Sheet: The New Morningstar Style Box Methodology," Morningstar, 2002, pp. 1-2.
Hedge Fund Research, Inc., HFR Strategy Definitions, Oct. 11, 2003, accessed at www.hedgefundresearch.com/pdf/HFR_Strategy_Definitions.pdf> accessed via Internet Archive Wayback Machine <www.archive.org>.
Howard "Study Conducted by Tom Howard using Apr. 2007 SBI and Zephyr Databases", published Sep. 2007, 33 pages.
Howard et al., "The Problematic "Style" Grid", Journal of Investment Consulting, vol. 8, No. 1, Winter 2005-2006, pp. 44-56.
Kacperczyk et al., "On the Industry Concentration of Actively Managed Equity Mutual Funds," 2005, pp. 1-49.
Kaplan, "Holdings-Based and Returns-Based Sytle Models," Jun. 2003, Morningstar, Inc., 22 pages.
Rekenthaler "In Defense of Style Boxes", Investment Advisor, Jun. 2006, 6 pages.
"Schwab Introduced New Online Mutual Fund Selection and Screener Tools", Dec. 22, 1999, PR Newswire.
Soter, "Implementing an Effective Financial Strategy," AFP Exchange, Winter 2000, vol. 20(1), ProQuest Central, pp. 36-40.
Surz, "What Good are Style Indexes? (Hint: Think Blend)," PPCA Inc., Jun. 2001, pp. 1-4.
Teo et al., "Style effects in the cross-section of stock returns", Journal of Financial Economics 74 (2004) 367-398.
"Types of funds/fund objectives", Oct. 6, 2004, USA Today's Stock Mutual Fund Report.
Wermers "A Matter of Style: The Causes and Consequences of Style Drift in Institutional Portfolios", Jul. 2002, 30 pages.
Brown et al., "Analysts can forecast accurately!" The Journal of Portfolio Management, Spring 1990, pp. 31-34.
BulldogResearch.com—Investment Research for Smart investors, at http://www.bulldogresearch.com/, printed Feb. 5, 2001, 31 pages.
International Search Report for International (PCT) Patent Application No. PCT/US07/78556, mailed Sep. 24, 2008, 2 pages.
Written Opinion for International (PCT) Patent Application No. PCT/US07/78556, mailed Sep. 24, 2008, 3 pages.
International Search Report for International (PCT) Patent Application No. PCT/US07/78556, mailed Oct. 6, 2008, 2 pages.
Written Opinion for International (PCT) Patent Application No. PCT/US07/78556, mailed Oct. 6, 2008, 3 pages.
International Preliminary Report on Patentability for International (PCT) Patent Application No. PCT/US07/78556, mailed Mar. 26, 2009, 5 pages.
Written Opinion for Singapore Patent Application No. 200901600-7, mailed Mar. 18, 2010, 11 pages.
Official Action for U.S. Appl. No. 11/854,978, mailed Dec. 10, 2008, 11 pages.
Official Action for U.S. Appl. No. 11/854,978, mailed Aug. 6, 2009, 14 pages.
Notice of Allowance for U.S. Appl. No. 11/854,978, mailed Jan. 26, 2010, 10 pages.
Official Action for U.S. Appl. No. 12/362,824, mailed Jun. 21, 2011, 11 pages.
Official Action for U.S. Appl. No. 12/648,615, mailed Jun. 22, 2011 16 pages.
Final Official Action for U.S. Appl. No. 12/648,615, mailed Mar. 29, 2012, 14 pages.
Notice of Allowance for U.S. Appl. No. 12/648,615, mailed Sep. 12, 2012, 22 pages.

* cited by examiner

| US and International Equity Strategy Ranks: 1988-2007 | | |
|---|---|---|
| Strategy | US Strategy Rank | International Strategy Rank |
| Competitive Position | 2 | 4 |
| Economic Conditions | 8 | 3 |
| Future Growth | 1 | 2 |
| Market Conditions | 7 | 7 |
| Opportunity | 3 | 5 |
| Profitability | 4 | 10 |
| Quantitative | 5 | 8 |
| Risk | 10 | 1 |
| Social Considerations | 9 | 9 |
| Valuation | 6 | 6 |

FIG. 1

STRATEGY MARKET BAROMETER

CROSS-REFERENCE TO RELATED APPLICATIONS

The present application claims the benefit of U.S. Provisional Application Ser. No. 61/468,930, filed Mar. 29, 2011, the entirety of which is incorporated herein by this reference. In addition, this application is related in subject matter to U.S. patent application Ser. Nos. 12/362,824 filed Jan. 30, 2009 and 12/648,615 filed Dec. 29, 2009, as well as U.S. Pat. No. 7,734,526, and the entirety of each is incorporated herein by reference.

FIELD OF THE INVENTION

The present invention is directed generally to an asset classification system and, more specifically, a system for predicting market returns based upon a computed comparison of select equity strategy indices.

BACKGROUND OF THE INVENTION

Many people want to know where the stock market is headed. To help answer this ever present question, many market forecasts are provided to market participants. Many such forecasts are based on historical price and volume data, using concepts like overbought and oversold. Others use economic and market data, trying to ascertain where the market is headed based on the current state of the economy and the markets. Still others try to gauge market sentiment by surveying investors to determine if they are more bullish or bearish. The American Association of Individual Investors (AAII) Sentiment Survey is one of the best known of these.

Overall stock market returns are driven by a wide range of return factors. These factors represent the many ways in which market participants impact stock prices by means of their trading activity. Market participants comprise all buyers and sellers. It is believed that some of these factors are associated with economy-wide changes, some are associated with stock market activity, some are associated with industry sectors, and some are associated with stock specific information. In general terms, return factors are unobservable and represent a conceptual way to think about how investors drive returns over time. Collectively, return factors drive overall market returns. Over time, the mix of factors upon which market participants focus changes. Some factor mixes produce higher market returns, while others produce lower, even negative returns. When estimating the market's expected or future return, it is important to know which return factor mix is the current focus of market participants. Embodiments of the present invention provide proxies that capture the current focus of market participants and therefore capture the return factor mix that is the current focus of market participants.

A strategy-based investment system categorizes investment managers and can also be used to categorize the investments they hold based on the strategy being pursued by the manager. The strategy based investment system categorizes investment managers and/or securities based on the way they analyze, buy, and sell assets and liabilities regardless of the name used to reference the investment manager's process. It is based on the self-described investment strategy or strategies of investment management. Investment strategy is sometimes also referred to as investment methodology, or investment technique. Investment strategy can be described in both quantitative and qualitative terms.

A strategy based investment system can be applied to any asset or liability class for which managers make investment decisions based on differing investment strategies. Asset classes that can be characterized by the strategy based investment system include, but are not limited to, mutual funds, Separately Managed Accounts or SMA's, separate accounts, hedge funds, company stocks, bonds, real estate, venture capital, commodity funds, private equity, energy funds, precious metals, international stocks, and international bonds. It is to be understood that a strategy based investment system is equally applicable to non-equity asset classes.

An individual manager's investment strategy, also referred to as a strategy profile, is generally comprised of self-selected (or manager selected) primary and secondary investment strategies. Within each strategy there will both quantitative and qualitative strategy elements which further describe the way a manager goes about analyzing, buying, and selling assets. The strategy profile for a given manager may include strategy elements from investment strategies other than the strategy elements of the primary and secondary strategies. Primary strategy refers to the investment strategy primarily, or most frequently or consistently, followed by a manager. Secondary strategy refers to the investment strategy secondarily, or, as compared to the primary strategy, next most frequently or consistently, followed by a manager. The manager is free to select as many or as few strategy elements as is needed to describe the investment process. Within the primary and secondary investment strategies, the manager can rank the relative importance of the strategy elements selected.

Active investment managers pursue an investment strategy in order to generate superior returns. This is true of equity managers, as well as investment managers involved with other asset classes. Each strategy focuses on a different subset of return factors and managers in each strategy or who pursue a particular strategy build a unique investment process around this subset of factors. As a consequence, how one strategy compares or ranks compared to other strategies vary over time as market participants, which is the entire universe of buyers and sellers, not just professional managers, focus on an ever different return factor mix. Because managers pursue their chosen strategy as consistently as possible, strategies provide a prism or lens through which the favored factor mix can be viewed. In other words, strategies stay the same but the favored factor mix is ever changing. Thus assessing a comparative rank of strategies relative to each other identifies which strategies market participants are presently favoring. This provides a proxy of market return factors, i.e., participant behavior, which is measurable, reliable and predictive.

As a threshold step in comparing strategies, it is helpful to create strategy indices. A multi-step development of the U.S. and International active equity mutual fund strategy identification process began in 2005. The first step was an initial identification effort based on collective knowledge of the industry. In the next step, equity managers, who managed or had managed a wide variety of equity funds, were interviewed in order to expand and refine the proposed identification system. Next, over 45,000 pieces of strategy information was gathered from roughly 3000 mutual fund (ignoring share classes) prospectuses.

From this information, ten (10) equity strategies were identified. These equity strategies are generally defined as follows:

Competitive Position:

Business principles, including quality of management, market power, product reputation, and competitive advantage. Consider the sustainability of the business model and history of adapting to market changes.

Economic Conditions:

Top down approach based on economic fundamentals; can include employment, productivity, inflation, and industrial output. Gauges where overall health of economy is in business cycle, resulting supply and demand situations in various industries, and best stocks to purchase.

Future Growth:

Companies poised to grow rapidly relative to others. The Future Growth and Valuation strategies are not mutually exclusive and can both be deemed important in investment process.

Market Conditions:

Consideration of stock's recent price and volume history relative to the market and similar stocks as well as the overall stock market conditions.

Opportunity:

Unique opportunities that may exist for a small number of stocks or at different points in time. May involve combining stocks and derivatives and may involve use of considerable leverage. Many hedge fund managers follow this strategy, but a mutual fund manager may also be so classified.

Profitability:

Company profitability, such as gross margin, operating margin, net margin and return on equity.

Quantitative:

Mathematical and statistical inefficiencies in market and individual stock pricing. Involves mathematical and statistical modeling with little or no regard to company and market fundamentals.

Risk:

Control overall risk, with increasing returns a secondary consideration. Risk measures considered may include beta, volatility, company financials, industry and sector exposures, country exposures, and economic and market risk factors.

Social Considerations:

Company's ethical, environmental, and business practices as well as an evaluation of the company's business lines in light of the current social and political climate.

Valuation:

Stocks selling cheaply compared to peer stocks based on accounting ratios and valuation techniques. The Valuation and Future Growth strategies are not mutually exclusive and can both be deemed an opportunity strategy, but a mutual fund manager may also be so classified.

The resulting information developed as part of the process also led to the identification of elements associated with the strategies. Elements are observable things managers do to make money. Elements are the next level down in describing a manager's strategy. Managers use elements as a way to tap into return factors. Once the data organization process was complete, primary and secondary strategies for each fund were identified. The system is explained in U.S. Pat. No. 7,734,526, the entirety of which is incorporated by reference herein. Using this system, U.S. and International active equity mutual funds domiciled in the U.S. have been strategy identified since 2007 by AthenaInvest, Inc. based in Greenwood Village, Colo. Ten (10) U.S. and ten (10) International Equity Strategy Indices were developed based on the ten strategies described above. The number (excluding share classes) of strategy identified U.S. active equity funds increased from 172 in January 1980 to 2051 by December 2010 and the number of International active equity funds increased from 11 to 746 over the same time period.

SUMMARY OF THE INVENTION

According to embodiments of the invention, a "Market Barometer" is calculated utilizing strategy rankings Strategy rank based Market Barometer captures and provides predictive investor behavior. Market Barometer does not judge the reasoning or ask why market participants invest (buy, sell or hold) as they do. It measures what investors are doing with their money. A high Market Barometer means that market participants are favoring a high market return mix, while low Market Barometer means participants are favoring a low market return mix. Consequently, a high Market Barometer is predictive of high market returns, while a low Market Barometer is predictive of low returns. To be clear, Market Barometer is separate from the technical concepts of momentum and mean reversion, which are often used for predicting future market returns. Instead, Market Barometer focuses on strategy ranks rather than on whether returns are positive or negative. It is possible for Market Barometer to be either high or low regardless of recent market performance. Empirical tests confirm that Market Barometer predictions are independent of trailing 6 and 12 month market returns. This is an important distinction. Many existing methods for predicting future market performance are based upon recent past returns as predictors. But past returns are really a measure of momentum, which is not an accurate predictor of future returns. Thus Market Barometer is capturing something different from what is being captured by momentum and mean reversion. Additionally, it should be noted that Market Barometer is not capturing market participant sentiment, but instead is capturing market participant behavior. This is because strategy ranks result from collective investment activity, so they depend upon on what investors do and not just on how investors feel about current market conditions. Thus Market Barometer is the classic "put your money where your mouth is" type of measure. Of course, it should be understood that Market Barometer not only can be utilized independently but also in combination with other relevant measurable data, such as fundamental measures and technical measures, in making investment decisions.

In one embodiment, the Market Barometer is based on the recent relative performance of the U.S. or International equity strategy indices versus the long term relative performance of these indices. For example, in one embodiment, on a periodic basis, the following process is implemented:

For each selected U.S. equity strategy, the average monthly return for all funds within a particular strategy is calculated by a computer processor and reported as that strategy's monthly return. Performance may take a number of different forms and could be returns, fund flows, and other forms as would be known by persons of skill in the art. Additionally, the monthly average could alternatively be a relatively short term average, such as weekly, biweekly, bimonthly, but is not limited to a monthly average.

The individual monthly performance for each selected U.S. equity strategy are then ranked by a processor.

A comparison or summary of the differences between the monthly strategy ranks and the long term performance ranks of the same strategies are output by the processor.

The trailing performance measures are scaled to create a predictor—in this embodiment a U.S. Market Barometer is created. For example, in one embodiment, the average absolute difference sum is calculated and scaled by the processor to create the U.S. Market Barometer reading.

The steps above are repeated by the processor using the International equity strategy clusters in order to create the International Equity Barometer. In addition, it should be appreciated that the approach used in calculating an equity Market Barometer may also be used in connection with other asset classes, including, for example, mutual funds, Separately Managed Accounts or SMA's, separate accounts, hedge funds, company stocks, bonds, real estate, venture capital, commodity funds, private equity, energy funds, precious metals, international stocks, and international bonds.

Thus, in one embodiment, a method for forecasting future performance of an equity market is provided, comprising:
 a. Identifying a plurality of primary strategies pursued by investment managers in analyzing equities;
 b. Assigning at least a primary strategy to individual equities;
 c. Calculating, with a processor, a short term average performance for all equities/funds having the same primary strategy;
 d. Capturing return factors currently driving the market by ranking the individual short term performance for each strategy using a processor;
 e. Outputting, by a processor, a summary of the differences between ranks determined in the prior step with the long term performance ranks for the strategy; and
 f. Scaling, by a processor, the trailing performance measures to create a market predictor for the equity market.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 1 is a table setting forth the long term performance ranking of U.S. and International Equity Strategies for the period 1988-2007.

DETAILED DESCRIPTION

According to at least one embodiment of the present invention, the first step in constructing a U.S. Market Barometer and an International Market Barometer is to calculate the long term performance rank of the previously identified Strategy Indices. This has been done in FIG. 1. Monthly Strategy Index returns for each strategy are calculated by a processor by averaging the monthly returns for all funds in that strategy that month. Funds are deemed "in a strategy" as explained in more detail in U.S. Pat. No. 7,734,526, incorporated herein by reference. Funds can move from one strategy to another over time based upon the statements of the fund manager. However, movement of funds among strategies does not adversely affect the results of the Market Barometer described herein. Fund returns, as reported by Thomson Reuters, are net of management, operating, 12b-1, and other automatically deducted fees. FIG. 1 reports the ranking results for the ten strategies based upon the 20 year long term period of 1988 through 2007.

For the twenty-year period assessed, the top performing U.S. equity Strategy was Future Growth, while the bottom performer was Risk. In the International arena, the top performing Strategy was Risk, while Profitability was the bottom ranked Strategy. The rank correlation between the two equity asset classes, U.S. and International, is essentially zero, so the pattern of market participant response to equity return factors is quite different across these two asset classes. As noted above, the concept of strategies can be applied to any asset or market class where active managers are attempting to beat an index. Therefore, persons of skill in the art, upon reading this disclosure, will recognize the greater application of the methodology and techniques described herein, and which is deemed to be within the scope of the present application.

In one embodiment relating to calculating a U.S. Market Barometer and/or International Market Barometer, the beginning of the month raw U.S. Market Barometer and International Market Barometer are calculated by a processor as the trailing 12 month weighted average monthly strategy rank absolute deviations from the ranks shown in FIG. 1. That is, raw Market Barometer measures the strategy rank deviations over the trailing 12 months. Raw Market Barometer's are scaled or normalized to average 10 and truncated to produce a U.S. Market Barometer range of −2 to 22 and an International Market Barometer range of 2 to 18. Each Market Barometer provides an estimate of the expected annual market return over the next month, as is shown below.

Figure 2:
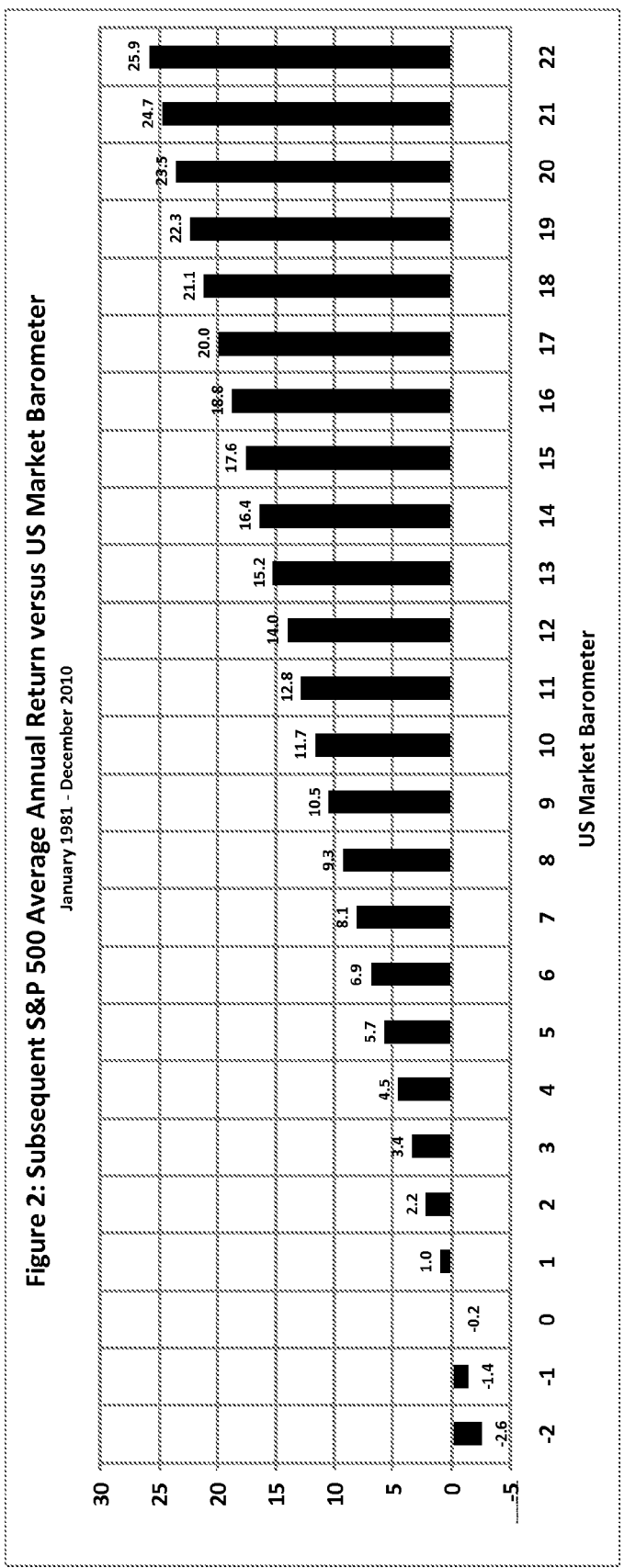
FIG. 2 is a graph comparing the Standard & Poor's average annual return to the Market Barometer for U.S. equities as calculated by embodiments of the present invention, for the period January 1981 to December 2010.
Figure 3:
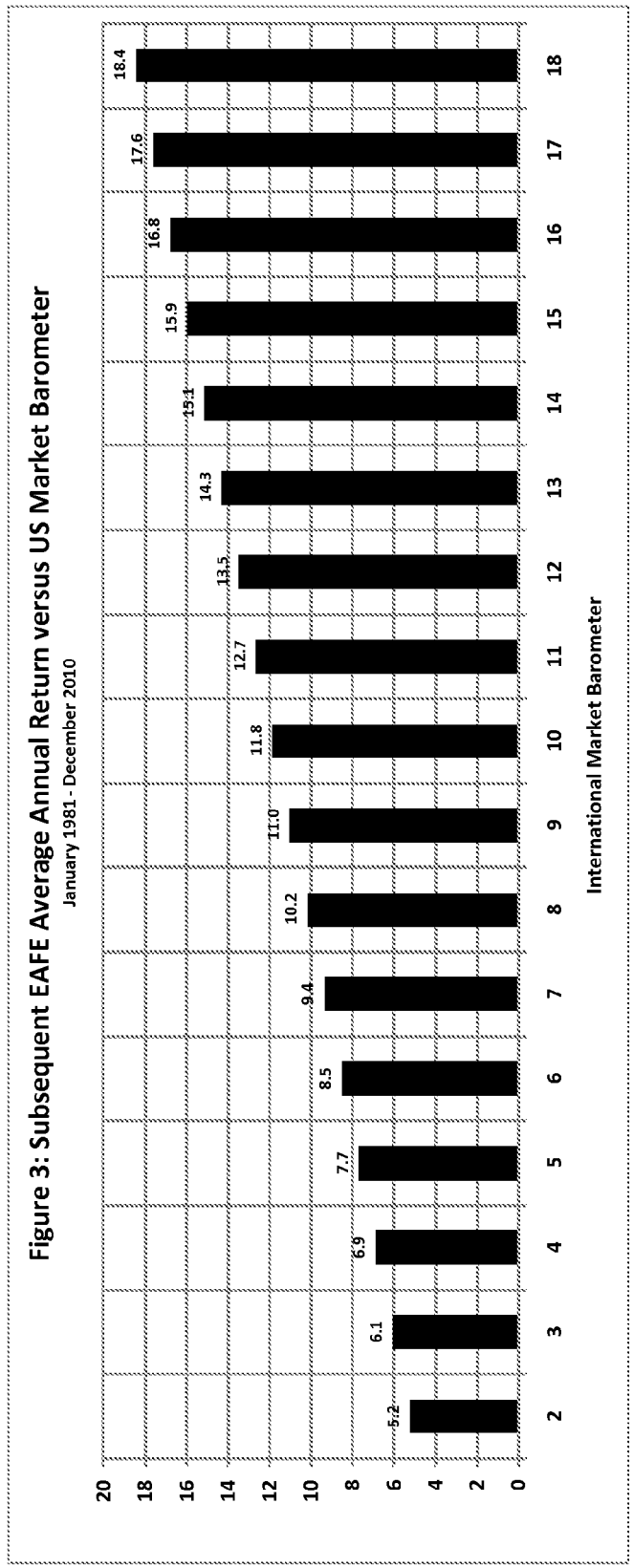
FIG. 3 is a graph comparing the Morgan Stanley Capital International Europe, Australia and Far East stock market index to the Market Barometer for U.S. equities as calculated by embodiments of the present invention, for the period January 1988 to December 2010.

FIGS. 2 and 3 provide evidence regarding Market Barometer predictive power in the context of equities as the asset class. Beginning of month U.S. Market Barometer and International Market Barometer are calculated for each of the 360 months January 1981 through December 2010. For each U.S. Market Barometer value from −2 through 22, the average subsequent S&P 500 annual returns are calculated. The U.S. Market Barometer trend line results are reported in FIG. 2 and reveal that average returns increase as U.S. Market Barometer increases. The data reveals that annual average return increases by 1.18%, on average, for every one unit increase in U.S. Market Barometer. That is, the more closely recent strategy ranks match long term strategy ranks, the higher are future market returns. This means that if investors are favoring the return factors underlying what have been the best long term performing strategies, subsequent market returns will on average be higher. While the mix of factors that represent high returns may vary over time, the Market Barometer will accurately capture market participant behavior and be predictive of future market performance. Similarly, if market participants are not favoring the return factors underlying what are the best long term performing strategies, the Market Barometer will show a weak or negative outlook.

The 360 month trend line results for International Market Barometer versus the Morgan Stanley Capital International Europe, Australia and Far East index (EAFE) returns are reported in FIG. 3. EAFE returns increase at an average rate of 0.82% when International Market Barometer increases by one unit. Based upon this data, in international equity markets, market participant behavior seems to be captured by International Market Barometer.

To determine the robustness of these results, additional statistical tests were conducted. The U.S. Market Barometer-S&P500 trend line regression reported in FIG. 2 is both economically and statistically significant (p-value=0.026). The out-of-sample results, comprised of monthly data before and after 1988-2007, display greater significance both economically and statistically. Monthly strategy data over the 1988-2007 sample period was used to estimate the long term strategy ranks used to calculate U.S. Market Barometer. Strong out-of-sample performance provides important support for U.S. Market Barometer predictive power. Finally, the probability of a positive monthly S&P 500 return increases as U.S. Market Barometer increases (63% of the 360 months saw a positive S&P 500 return). So both returns and the probability of a positive return increase as U.S. Market Barometer increases.

The International results are not as robust as those for U.S. First, not all of the strategies existed for the entire 1980 through 2010 time period. Thus early in the sample, ranking was based on fewer than 10 strategies. Unlike the U.S. Market Barometer trend line regression, the International Market Barometer regression, while economically significant, is statistically insignificant (p-value=0.35). However, the out-of sample International Market Barometer results are both economically and statistically significant, providing support for the usefulness of International Market Barometer. And like U.S. Market Barometer, an increasing International Market Barometer means an increasing probability of a positive monthly EAFE return.

It is believed that both U.S. Market Barometer and International Market Barometer are predictive of future market returns. Used separately or together, they provide additional information for making tactical portfolio management decisions. Their predictive power is independent of the well known short term momentum and mean reversion that are often used when making tactical portfolio decisions. Thus Market Barometer's can add value to current timing approaches or can be used stand alone.

The present invention, in various embodiments, includes methods, processes, systems and/or apparatus as depicted and described herein, including sub processes and subsystems thereof. Those of skill in the art will understand how to implement the present invention after reading and understanding the present disclosure. The present invention, in various embodiments, includes providing processes in the absence of items not depicted and/or described herein. For example, a strategy based investment (SBI) system categorizes investment managers and/or securities based on the way they analyze, buy, and sell assets and liabilities regardless of the name used to reference the investment manager's process. As will be appreciated, the SBI system can be applied to any asset or liability class for which managers make investment decisions based on differing investment strategies. Differing sets of investment strategies are used for differing types of assets or securities. As will be appreciated, the particular set or suite of investment strategies employed by a manager depends on the type of asset or security. An investment strategy used for mutual funds frequently differs, for instance, from that employed for a hedge fund. To accommodate this variation in investment strategies, the invention can use an asset or security-type identifier to indicate the particular set or suite of investment strategies applicable in any given application or otherwise to be presented to a user. This identifier can further be used to categorize assets or securities in the data structures and in assigning assets and securities to peer groups. The system may be used where investment managers are attempting to outperform a benchmark. Strategies are the way in which active managers attempt to beat the benchmark. While strategies may vary between asset classes, the method for calculating a market barometer would be the same. Since the SBI system is based on manager input regarding the specific way in which asset management decisions are made, asset classes that can be characterized by the SBI system include, but are not limited to, mutual funds, Separately Managed Accounts or SMA's, separate accounts, hedge funds, company stocks, bonds, real estate, venture capital, commodity funds, private equity, energy funds, precious metals, international stocks, and international bonds. Within each strategy there will both quantitative and qualitative strategy elements which further describe the way a manager goes about analyzing, buying, and selling assets.

The foregoing discussion of the invention has been presented for purposes of illustration and description. The foregoing is not intended to limit the invention to the form or forms disclosed herein. The features of the embodiments of the invention may be combined in alternate embodiments other than those discussed above, such as in connection with other asset classes. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent calculations, processes, methodologies or steps to those claimed, whether or not such alternate, interchangeable and/or equivalent calculations, processes, methodologies or steps are disclosed herein, and without intending to publicly dedicate any patentable subject matter.

What is claimed is:

1. A method for forecasting future performance of an equity market, comprising:
   a. Identifying a plurality of primary strategies pursued by investment managers in analyzing equities;
   b. Assigning at least a primary strategy to individual equities;
   c. Calculating, with a processor, a short term average performance for all equities/funds having the same primary strategy;
   d. Obtaining a long term average performance for all equities/funds having a primary strategy;
   e. Ranking the individual short term performance for each strategy using a processor;
   f. Calculating, by a processor, the difference between ranks determined in the prior step with the long term performance ranks for each strategy for a trailing period;
   g. Summing, by a processor, the absolute differences from the prior step; and
   h. Scaling, the sum from the prior step, by a processor, to create a predictor for the equity market.

2. The method of claim 1, wherein the short term average performance is a monthly average.

3. The method of claim 1, wherein performance is selected from the group comprising return or fund flow.

4. The method of claim 1, the short term performance ranking is from largest to smallest or from smallest to largest.

5. The method of claim 1, wherein the equity market is a U.S. equity market.

6. The method of claim 1, wherein the primary strategies comprise competitive position, economic conditions, future growth, market conditions, opportunity, profitability, quantitative, risk, social considerations and valuation.

7. A method of forecasting future performance of an asset class where investment managers attempt to outperform one or more known publicly available benchmarks for the asset class, comprising:

a. Identifying a plurality of primary strategies pursued by investment managers in analyzing assets within an asset class;
b. Assigning at least a primary strategy to individual assets within an asset class;
c. Calculating, with a processor, a short term average performance of each asset within a primary strategy;
d. Obtaining a long term average performance of each asset within a primary strategy;
e. Ranking the individual performance for each primary strategy using a processor;
f. Calculating, by a processor, the difference between ranks determined in the prior step with the long term performance ranks for each strategy;
g. Summing, by a processor, the absolute differences from the prior step; and
h. Calculating, by a processor, a new scale for the sUM calculated in the prior step to create a predictor for the asset class.

8. The method of claim 7, wherein the short term average is a monthly average.

9. The method of claim 7, wherein performance is selected from the group comprising return or fund flow.

10. The method of claim 7, wherein the asset class comprises real estate, precious metals, gem stones, mutual funds, Separately Managed Accounts, separate accounts, hedge funds, company stocks, bonds, venture capital, commodity funds, private equity, energy funds, precious metals, international stocks, and international bonds.

11. A method for forecasting future performance of an equity market using data from a preexisting strategy based system that categorizes managers as pursuing a strategy and assigns a strategy to individual equities based upon the managers who buy, sell and/or hold those individual equities, comprising:
a. Calculating, with a processor, a short term average performance for all equities/funds having the same primary strategy;
b. Ranking the individual short term performance for each strategy using a processor;
c. Obtaining a long term average performance for each strategy;
d. Calculating, by a processor, the differences between ranks determined in the prior step with the long term performance ranks for each strategy;
e. Summing, by a processor, the absolute differences from the prior step; and
f. Scaling the sum from the prior step, by a processor, to create a predictor for the equity market.

12. The method of claim 11, wherein the short term average is a monthly average.

13. The method of claim 11, wherein performance is selected from the group comprising return or fund flow.

14. The method of claim 11, wherein the short term performance ranking is from largest to smallest or from smallest to largest.

15. The method of claim 11, wherein the equity market is a U.S. equity market.

16. The method of claim 11, wherein the primary strategies comprise competitive position, economic conditions, future growth, market conditions, opportunity, profitability, quantitative, risk, social considerations and valuation.

17. The method of claim 1, wherein the period for assessing performance is a trailing period of less than, equal to, or greater than three months.

18. The method of claim 7, wherein the period for assessing performance is a trailing period of less than, equal to, or greater than three months.

19. The method of claim 11, wherein the period for assessing performance is a trailing period of less than, equal to, or greater than three months.

20. The method of claim 1, wherein the step of summing the absolute differences from step f comprises, determining the absolute value of the difference between the long term performance rank and short term performance rank for each strategy and then summing the determined absolute values.

21. The method of claim 1, wherein the step of scaling comprises moving the average of the sums of the absolute differences between the long term and short term performance ranks of the strategies.

22. The method of claim 1, wherein the step of scaling comprises truncating the range of the sums of the absolute differences between the long term and short term performance ranks of the strategies.

* * * * *